United States Patent Office 3,652,566
Patented Mar. 28, 1972

3,652,566
2-ACYLAMINO PYRIMIDIN-4YL CARBAMATES
Ranajit Ghosh and Nigel Douglas Bishop, Wokingham, and Derek John William Bullock, Marlow, England, assignors to Imperial Chemical Industries Limited, London, England
No Drawing. Filed Sept. 29, 1969, Ser. No. 862,008
Claims priority, application Great Britain, Oct. 29, 1968, 51,274/68
Int. Cl. C07d
U.S. Cl. 260—256.4 C    3 Claims

ABSTRACT OF THE DISCLOSURE

Pesticidally active pyrimidine derivative of formula:

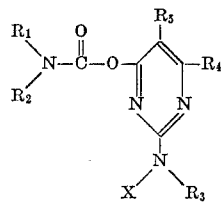

wherein $R_1$, $R_2$ and $R_3$ are alkyl, $R_5$ and $R_6$ are hydrogen, alkyl, cyanoalkyl or together alkylene, and X is acyl.

---

This invention relates to new pyrimidine derivatives, to processes for making them, to compositions containing them and to methods for combating plant and pests.

Accordingly the present invention provides new pyrimidine derivatives having the general formula:

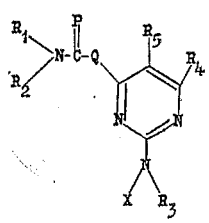

wherein $R_1$, $R_2$ and $R_3$ represent hydrogen atoms or hydrocarbyl groups; $R_4$ and $R_5$ represent hydrogen or halogen atoms, or hydrocarbyl groups linked directly, or through oxygen, nitrogen or sulphur atoms, to the pyrimidine ring, or $R_4$ and $R_5$ together form a hydrocarbyl bridging group, or a hydrocarbyl bridging group comprising oxygen, sulphur or nitrogen atoms in the chain; P and Q are oxygen or sulphur atoms; and X is an acyl group.

Preferred compounds are, for example, those wherein X is an acyl group of the type R·CO—, the group R being hydrogen or hydrocarbyl, hydrocarbylthio, hydrocarbyloxy, or hydrocarbylamino.

Any of the specified groups for R, $R_1$, $R_2$, $R_3$, $R_4$ and $R_5$ may bear substituent atoms or groups. Thus when a "hydrocarbyl group," for example, is referred to above both unsubstituted and substituted hydrocarbyl groups are intended.

In a further aspect the invention provides a pyrimidine derivative of the general formula:

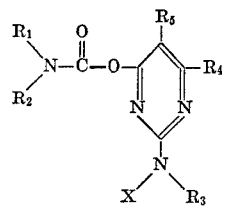

wherein $R_1$, $R_2$ and $R_3$ are alkyl groups; $R_4$ and $R_5$ are hydrogen atoms, or alkyl or cyanoalkyl groups, together form an alkylene bridging group; and X is a group R·CO—, atom in which R is a hydrogen, or an alkyl or alkylamino group. Preferred groups contain 1 to 4 carbon atoms.

The invention particularly includes the specific pyrimidine derivatives set out in Table 1 below:

TABLE 1

| Compound No. | Structural formula | Physical constant, M.P., °C. |
|---|---|---|
| 1 | ![formula] $CH_3$, $CH_3$, N—C—O—pyrimidine—$CH_3$, $CH_3$; N-ring substituent H—C(=O)—N(CH_3) | 80–82 |
| 2 | $CH_3$, $CH_3$, N—C—O—pyrimidine—$CH_3$; substituent $CH_3$—C(=O)—N—$CH_3$ | 58–60 |
| 3 | $CH_3$, $CH_3$, N—C—O—pyrimidine—$CH_3$; substituent $CH_3$—NH—C(=O)—N($CH_3$) | 85 |
| 4 | $CH_3$, $CH_3$, N—C—O—pyrimidine—$CH_2.CH_2.CH_2.CH_3$, $CH_3$; substituent H—C(=O)—N($CH_2.CH_3$) | 61 |
| 5 | $CH_3$, $CH_3$, N—C—O—pyrimidine—$CH_2.CH_2.CH_2.CH_3$; substituent H—C(=O)—N($CH_2.CH_2.CH_3$) | 60 |

TABLE 1.—Continued

| Compound No. | Structural formula | Physical constant, M.P., °C. |
|---|---|---|
| 6 | ![structure with CH3-N(CH3)-C(=O)-O-pyrimidine-N(CH3)-CHO] | 95 |
| 7 | ![structure with CH3 group on pyrimidine ring, N(CH3)-COCH3] | (1) |
| 8 | ![structure with CH2.CH2.CN substituent] | 106 |

[1] Pale yellow oil.

In this specification the numbering of the pyrimidine ring is as follows:

It may be noted that the 4- and 6-positions are equivalent.

The compounds of this invention can be, for example, obtained by acylation of the corresponding 2-aminopyrimidinyl carbamates.

The compounds of the present invention are very toxic towards a variety of insect pests including black aphids (*Aphis fabae*), green aphids (*Megoura viciae*), red spider mites (*Tetranychus telarious*), and common houseflies (*Musca domestica*).

The compounds of the invention also possess antifungal activity against fungal disease including, for example, the following specific diseases:

*Phytophthora infestans* (late blight) on tomatoes.
*Sphaerotheca fuliginea* (powdery mildew) on cucumber.
*Podosphaera leucotricha* (powdery mildew) on apple.

In use, the invention compounds, or compositions containing them, may be applied in a variety of ways. Thus, their application can suitably be directed onto the foliage of the plant or onto infected and/or infested areas thereof; alternatively the soil surrounding the plant can be treated with the invention compounds or compositions containing them. If desired the seeds themselves can be similarly treated.

According to a further feature therefore we provide a method of combating undesired pests on plants which comprises applying to the locus of the plant a compound or composition as hereinbefore defined.

In a further aspect the invention provides a method of combating pests on plants which comprises applying to the plants or to seeds thereof a compound or composition as hereinbefore defined. The invention further includes a method of treating agricultural soil comprising applying to the soil a compound or a composition as hereinbefore defined.

In a yet further aspect the invention includes a method of combating pests which comprises applying to the pests or to a pest habitat a compound or composition as hereinbefore defined.

The compounds and compositions of the invention may be used for agricultural or horticultural purposes and the compound or type of composition used in any instance will depend upon the particular purpose for which it is to be used.

Compositions comprising the invention compounds may be in the form of dusting powders or granules wherein the active ingredient is mixed with a solid diluent or carrier. Suitable solid diluents or carriers may be, for example, kaolin, bentonite, kieselguhr, dolomite, calcium carbonate, talc, powdered magnesia, Fuller's earth, gypsum, Hewitt's earth, diatomaceous earth and China clay. Compositions for dressing seed, for example, may comprise an agent assisting the adhesion of the composition to the seed, for example, a mineral oil.

The compositions may also be in the form of dispersible powders or grains comprising, in addition to the active ingredient, a wetting agent to facilitate the dispersion of the powder or grains in liquids. Such powders or grains may include fillers, suspending agents and the like.

The compositions may also be in the form of liquid preparations to be used as dips or sprays which are generally aqueous dispersions or emulsions containing the active ingredient in the presence of one or more wetting agents, dispersing agents, emulsifying agents or suspending agents.

Wetting agents, dispersing agents and emulsifying agents may be of the cationic, anionic or non-ionic type. Suitable agents of the cationic type include, for example cetyltrimethylammonium bromide. Suitable agents of the anionic type include, for example, soaps; salts of aliphatic monoesters of sulphuric acid, for example sodium lauryl sulphate; salts of sulphonated aromatic compounds, for example sodium dodecylbenzenesulphonate; sodium, calcium or ammonium lignosulphonate, butylnaphthalene sulphonate, and a mixture of the sodium salts of diisopropyl- and triisopropyl-naphthalene sulphonic acids.

Suitable agents of the non-ionic type include, for example, the condensation products of ethylene oxide with fatty alcohols such as oleyl alcohol or cetyl alcohol, or with alkyl phenols such as octylphenol, nonylphenol and octylcresol. Other non-ionic agents are the partial esters derived from long chain fatty acids and hexitol anhydrides, and condensation products of the said partial esters with ethylene oxide, and the lecithins.

Suitable suspending agents are, for example, hydrophilic colloids, for example, polyvinylpyrrolidone and sodium carboxymethylcellulose, and the vegetable gums, for example, gum acacia and gum tragacanth.

The aqueous solutions, dispersions or emulsions may be prepared by dissolving the active ingredient or ingredients in an organic solvent which may contain one or more wetting, dispersing or emulsifying agents and then adding the mixture so obtained to water which may likewise contain one or more wetting, dispersing or emulsifying agents. Suitable organic solvents are ethylene dichloride, isopropyl alcohol, propylene glycol, diacetone alcohol, toluene, kerosene, methylnaphthalene, xylenes and trichloroethylene.

The compositions to be used as sprays may also be in the form of aerosols wherein the formulation is held in a container under pressure in a presence of a propellant such as fluorotrichloromethane or dichlorodifluoromethane.

By the inclusion of suitable additives, for example, for improving the distribution, adhesive power and resistance to rain on treated surfaces, the different compositions can be better adapted for the various uses for which they are intended.

The compounds may also be conveniently formulated by admixing them with fertilizers. A preferred composition of this type comprises granules of fertilizer material incorporating, for example coated with, a compound of the invention. The fertilizer material, may, for example, comprise nitrogen or phosphate- containing substances.

In yet a further aspect of the invention, therefore, we provide a fertilizer comprising a compound as hereinbefore defined.

The compositions which are to be used in the form of aqueous dispersions or emulsions are generally supplied in the form of a concentrate containing a high proportion of the active ingredient or ingredients, the said concentrate to be diluted with water before use. These concentrates are often required to withstand storage for prolonged periods and after such storage, to be capable of dilution with water in order to form aqueous preparations which remain homogeneous for a sufficient time to enable them to be applied by conventional spray equipment. The concentrates may conveniently contain from 10-85% by weight of the active ingredient or ingredients, and generally from 25-60% by weight of the active ingredient or ingredients. When diluted to form aqueous preparations, such preparations may contain varying amounts of the active ingredient or ingredients depending upon the purpose for which they are to be used, but an aqueous preparation containing between 0.0001% and 10.0% by weight of active ingredient or ingredients may be used.

It is to be understood that the compositions of this invention may comprise, in addition to an invention compound, one or more other compounds having biological activity.

The invention is illustrated, but not limited, by the following examples.

EXAMPLE 1

This example illustrates the preparation of 2-N-methylformamido-5,6-dimethyl-4 - pyrimidinyl dimethylcarbamate, having the structure:

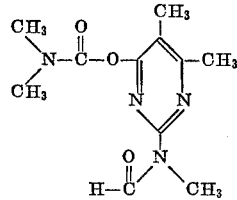

Formic-acetic anhydride was prepared by adding formic acid (98-100%; 20.0 cc.) to acetic anhydride (40 cc.) at 0° C. and heating the mixture at 50° C. for 15 minutes. 2-methylamino-5,6 - dimethyl-4-pyrimidinyl dimethylcarbamate (3.0 g.) was then added in small portions to the mixture at 0° C. Ether (80 cc.) was then added, and the mixture refluxed 24 hours. After removal of solvent and excess anhydrides by evaporation under reduced pressure, the residue was recrystallised from an ether-petrol mixture to yield 2-N-methylformamido-5,6-dimethyl-4-pyrimidinyl dimethylcarbamate as a white solid, M.P. 80-82° C.

EXAMPLE 2

This example illustrates the preparation of 2-N-methylacetamido-5,6-dimethyl-4-pyrimidinyl dimethylcarbamate, having the structure;

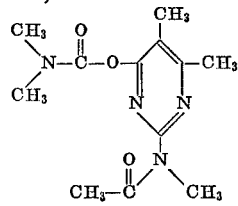

To a mixture of 2-methylamino-5,6-dimethyl-4-pyrimidinyl dimethyl carbamate (3.0 g.) and acetic anhydride (40 cc.) was added ether (100 cc.) and the mixture refluxed for 24 hours. After removal of solvent and excess anhydride by evaporation under reduced pressure, the residue was extracted with an ether-ethanol mixture to remove the product from a small amount of insoluble starting material. Evaporation of the solvent yielded 2-N-methylacetamido-5,6-dimethyl-4-pyrimidinyl dimethylcarbamate as a white solid, M.P. 58-60° C.

EXAMPLE 3

This example illustrates the preparation of 2-(1,3-dimethylureido)-5,6-dimethyl - 4-pyrimidinyl dimethylcarbamate, having the structure:

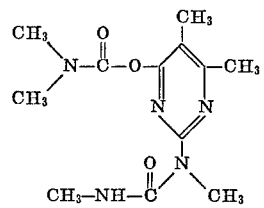

A mixture of 2-methylamino-5,6-dimethyl-4-pyrimidinyl dimethylcarbamate (0.3 g.), methyl isocyanate (2.0 g.), chloroform (10 cc.), and N-methylmorpholine (0.1 cc.) was allowed to stand at room temperature for 72 hours, and then refluxed for 30 minutes. After evaporation of the solvent under reduced pressure, the residue was extracted several times with hot ether, and the extracts evaporated to yield a white solid, which on recrystallisation from a mixture of ether and petrol yielded 2-(1,3-dimethylureido) - 5,6-dimethyl-4-pyrimidinyl dimethylcarbamate as a white solid, M.P. 85° C.

EXAMPLE 4

This example illustrates the preparation of 5-n-butyl-2-N-ethylformamido-6-methyl-4-pyrimidinyl dimethylcarbamate, having the structure:

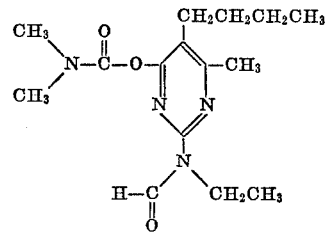

The procedure of Example 1 was followed except that 5-n-butyl-2-ethylamino - 6 - methyl-4-pyrimidinyl dimethylcarbamate was used in place of 2-methylamino-5,6-dimethyl-4-pyrimidinyl dimethylcarbamate. 5-n-butyl-2 - N-ethylformamido - 6-methyl-4-pyrimidinyl dimethylcarbamate was obtained as a white crystalline solid, M.P. 61–62° C.

EXAMPLE 5

This example illustrates the preparation of 5-n-butyl-2-N-propylformamido-6-methyl-4-pyrimidinyl dimethylcarbamate, having the structure:

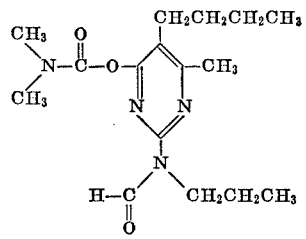

The procedure of Example 1 was followed, except that 5-n - butyl-2-propylamino-6-methyl-4-pyrimidinyl dimethylcarbamate was used in place of 2-methylamino-5,6-dimethyl-4-pyrimidinyl dimethylcarbamate. 5-n-butyl - 2-N- propylformamido - 6 - methyl-4-pyrimidinyl dimethylcarbamate was obtained as an off-white solid, having a M.P. of 60° C. after recrystallisation from petroleum ether (boiling range 40–60° C.).

EXAMPLE 6

This example illustrates the preparation of 2-N-methylformamido-4-(5,6,7,8 - tetrahydroquinazolinyl) dimethylcarbamate, having the structure:

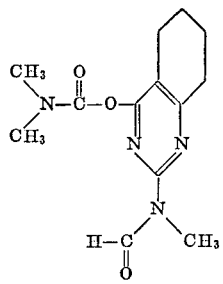

The procedure of Example 1 was followed, except that 2-methylamino - 4-(5,6,7,8-tetrahydroquinazolinyl) dimethylcarbamate was used in place of 2-methylamino-5,6-dimethyl-4-pyrimidinyl dimethylcarbamate. 2-N - methylformamido - 4 - (5,6,7,8 - tetrahydroquinazolinyl) dimethylcarbamate was obtained as a white solid, having a M.P. of 95° C. after recrystallisation from a mixture of acetone and petroleum ether (boiling range 60–80° C.).

EXAMPLE 7

This example illustrates the preparation of 2-N-methylacetamido-6-methyl - 4 - pyrimidinyl dimethylcarbamate, having the structure:

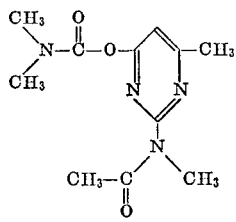

A mixture of 2-methylamino-6-methyl-4-pyrimidinyl dimethylcarbamate (1.5 g.) and acetic anhydride (5.0 cc.) was refluxed together for 2 hours. After removal of the volatile portion of the mixture by heating to 100° C. under a reduced pressure of 0.01 mm., 2-N-methylacetamido-6-methyl-4-pyrimidinyl dimethylcarbamate was obtained as a pale yellow oil.

EXAMPLE 8

This example illustrates the preparation of 5-(2-cyanoethyl)-2-N - methylformamido - 6 - methyl-4-pyrimidinyl dimethylcarbamate, having the structure:

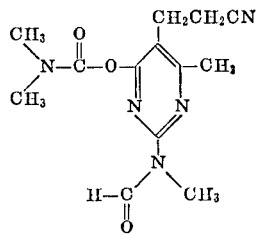

The procedure of Example 1 was followed, except that 5(2-cyanoethyl) - 2 - methylamino-6-methyl - 4 - pyrimidinyl dimethylcarbamate was used in place of 2-methylamino-5,6-dimethyl-4-pyrimidinyl dimethylcarbamate. 5-(2 - cyanoethyl)-2-N-methylformamido-6-methyl - 4 - pyrimidinyl dimethylcarbamate was obtained as a white solid, having a melting point of 106° C. after recrystallisation from petroleum ether (boiling range, 60–80° C.).

EXAMPLE 9

This example illustrates a concentrate comprising a miscible oil which is readily convertible by dilution with water into a liquid preparation suitable for spraying purposes. The concentrate has the following composition:

|  | Percent wt. |
|---|---|
| Compound No. 2 of Table 1 | 25.0 |
| "Lubrol" L (alkylphenol/ethylene oxide condensate; "Lubrol" is a trademark) | 2.5 |
| Calcium dodecylbenzenesulphonate | 2.5 |
| "Aromasol" H (alkylbenzene solvent; "Aromasol" is a trademark) | 70.0 |
|  | 100.0 |

EXAMPLE 10

This example also illustrates a concentration which is in the form of a miscible oil. The composition of this concentrate is as follows:

|  | Percent wt. |
|---|---|
| Compound No. 2 of Table 1 | 25.0 |
| "Lubrol" L ("Lubrol" is a trademark) | 4.0 |
| Calcium dodecylbenzenesulphonate | 6.0 |
| "Aromasol" H ("Aromasol" is a trademark) | 65.0 |
|  | 100.0 |

EXAMPLE 11

This example illustrates a wettable powder having the following composition:

|  | Percent wt. |
|---|---|
| Compound No. 2 of Table 1 | 25.0 |
| Sodium silicate | 5.0 |
| Calcium lignosulphonate | 5.0 |
| China clay | 65.0 |
|  | 100.0 |

EXAMPLE 12

This example illustrates an atomisable fluid comprising a mixture consisting of 25% by weight of the compound of No. 2 of Table 1 and 75% by weight of xylene.

EXAMPLE 13

This example illustrates a dusting powder which may be applied directly to plants or other surfaces and comprises 1% by weight of the compound No. 2 of Table 1 and 99% by weight of talc.

EXAMPLE 14

25 parts by weight of the product described in Example 2, 65 parts by weight of xylene, and 10 parts of an alkyl aryl polyether alcohol ("Triton" X–100; "Triton" is a trademark) were mixed in a suitable mixer.

EXAMPLE 15

The ingredients listed below were ground together in the proportions stated to produce a powdered mixture readily dispersible in liquids.

|  | Percent wt. |
|---|---|
| Compound No. 2 of Table 1 | 50.0 |
| Dispersol T (disodium salt of methylene bis(naphthalene sulphonic acid) | 5.0 |
| China clay | 45.0 |
|  | 100.0 |

EXAMPLE 16

A composition in the form of grains readily dispersible in a liquid (for example water) was prepared by grinding together the first four of the ingredients listed below in the presence of water and then the sodium acetate was mixed in. The admixture was dried and passed through a British Standard mesh sieve, size 44–100 to obtain the desired size of grains.

|                              | Percent wt. |
|------------------------------|-------------|
| Compound No. 2 of Table 1    | 50.0        |
| Dispersol T                  | 12.5        |
| Goulac                       | 5.0         |
| Calcium dodecylbenzenesulphonate | 12.5    |
| Sodium acetate               | 20.0        |
|                              | 100.0       |

EXAMPLE 17

A composition suitable for use as a seed dressing was prepared by mixing all three of the ingredients set out below in the proportions stated

|                              | Percent wt. |
|------------------------------|-------------|
| Compound No. 2 of Table 1    | 80.0        |
| Mineral oil                  | 2.0         |
| China clay                   | 18.0        |
|                              | 100.0       |

EXAMPLE 18

A granular composition was prepared by dissolving the active ingredient in a solvent, spraying the solution obtained onto the granules of pumice and allowing the solvent to evaporate.

|                              | Percent wt. |
|------------------------------|-------------|
| Compound No. 2 of Table 1    | 5.0         |
| Pumice granules              | 95.0        |
|                              | 100.0       |

EXAMPLE 19

A formulation was prepared by mixing and grinding the ingredients recited below in the proportions stated.

|                              | Percent wt. |
|------------------------------|-------------|
| Compound No. 2 of Table 1    | 40.0        |
| Goulac                       | 10.0        |
| Water                        | 50.0        |
|                              | 100.0       |

The toxicity of a number of the compounds of this invention towards a variety of insect pests was investigated and the tests conducted and results obtained are set out below. The compounds of the invention were in each case used in the form of a liquid preparation containing 0.1% by weight of the compound. The preparations were made by dissolving each of the compounds in a mixture of solvents consisting of 1 part by volume of acetone and 1 part by volume of ethyl alcohol.

The solutions were then diluted with water containing 0.01% by weight of a wetting agent sold under the trade name of "Lissapol" NX (nonyl phenol ethylene oxide condensate) until the liquid preparations contained the required concentration of the compound ("Lissapol" is a trademark).

The test procedure adopted with regard to each test insect was basically the same and comprised supporting a number of the insects on some medium which may be a host plant or some foodstuff on which the insect feeds, and treating either or both the insects and the medium with the preparations. The mortality of the insects was then assessed at periods varying from one to three days after the treatment.

The results of the tests are given below in Table 2. In this table the first column indicates the compound used. Each of the subsequent columns indicates the name of the test insect, the host plant or medium on which it was supported and the number of days which were allowed to elapse after treatment before assessing the percentage of insects which had been killed. The assessment is expressed in integers which range from 0 to 3.

0 represents less than 30% kill  
1 represents from 30–49% kill  
2 represents from 50–90% kill  
3 represents over 90% kill The concentration of the invention compound in the solutions used was 1,000 parts per million for all the pests.

TABLE 2

| Compound No. Table 1 | Aphis fabae (Black aphid) | Megoura viciae (Green aphid) | Tetranychus telarius (Red spider mite) | Tetranychus telarius (Red spider egg) | Musca domestica (Housefly) Milk and sugar cotton wool, 1 day |
|---|---|---|---|---|---|
| | Broad bean, 2 days | | French bean, 3 days | | |
| 1 | 3 | 3 | 0 | 0 | 0 |
| 2 | 3 | 3 | 3 | 2 | 2 |
| 3 | 3 | 3 | 0 | 0 | 0 |
| 4 | 0 | 3 | 0 | 0 | 0 |
| 5 | 3 | 3 | 0 | 0 | 0 |
| 6 | 3 | 3 | 0 | 0 | 2 |
| 7 | 3 | 3 | 0 | 0 | 2 |
| 8 | 3 | 3 | 1 | 0 | 2 |

What is claimed is:

1. A pyrimidine derivative of the formula:

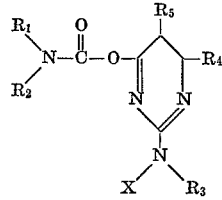

wherein $R_1$, $R_2$ and $R_3$ are alkyl containing 1–4 carbon atoms; $R_4$ and $R_5$ are hydrogen alkyl containing 1–4 carbon atoms or cyanoethyl, or together are tetramethylene and X is a group R.CO—, in which R is hydrogen, alkyl containing 1–4 carbon atoms or alkylamino containing 1–4 carbon atoms.

2. A pyrimidine derivative according to claim 1 wherein $R_1$ to $R_5$ are alkyl containing from 1 to 4 carbon atoms; and R is hydrogen or alkyl or alkylamino containing from 1 to 4 carbon atoms.

3. A pyrimidine derivative according to claim 1 wherein $R_1$, $R_2$, $R_3$, $R_4$ and $R_5$ are methyl and X is

References Cited

UNITED STATES PATENTS 3,493,574   2/1970   Baranyovits et al. __ 260—256.4

ALEX MAZEL, Primary Examiner

R. V. RUSH, Assistant Examiner

U.S. Cl. X.R.

260—256.4 Q, 256.5 R; 424—251